(12) United States Patent
Dey

(10) Patent No.: US 11,785,110 B1
(45) Date of Patent: Oct. 10, 2023

(54) SELECTIVE ONLINE CONTENT REMOVAL BASED ON ACTIVITY HISTORY

(71) Applicant: Romit Dey, Mountain View, CA (US)

(72) Inventor: Romit Dey, Mountain View, CA (US)

(73) Assignee: Romit Dey, Mountain View, CA (US)

( * ) Notice: Subject to any disclaimer, the term of this patent is extended or adjusted under 35 U.S.C. 154(b) by 0 days.

(21) Appl. No.: 18/154,953

(22) Filed: Jan. 16, 2023

Related U.S. Application Data

(63) Continuation of application No. 17/718,987, filed on Apr. 12, 2022, now Pat. No. 11,556,603, which is a continuation of application No. 17/033,877, filed on Sep. 27, 2020, now Pat. No. 11,328,028, which is a continuation of application No. 16/579,244, filed on Sep. 23, 2019, now Pat. No. 10,817,580, which is a continuation of application No. 15/996,456, filed on Jun. 2, 2018, now Pat. No. 10,467,310.

(51) Int. Cl.
| | |
|---|---|
| *H04L 67/50* | (2022.01) |
| *H04L 67/55* | (2022.01) |
| *H04L 67/306* | (2022.01) |
| *G06Q 20/38* | (2012.01) |
| *H04L 43/00* | (2022.01) |
| *H04L 9/40* | (2022.01) |
| *G06F 16/9535* | (2019.01) |
| *G06F 16/9537* | (2019.01) |

(52) U.S. Cl.
CPC ........ *H04L 67/535* (2022.05); *G06F 16/9535* (2019.01); *G06F 16/9537* (2019.01); *G06Q 20/389* (2013.01); *H04L 43/14* (2013.01); *H04L 63/102* (2013.01); *H04L 67/306* (2013.01); *H04L 67/55* (2022.05)

(58) Field of Classification Search
CPC ..... H04L 67/535; H04L 43/14; H04L 63/102; H04L 67/306; H04L 67/55; G06F 16/9535; G06F 16/9537; G06Q 20/389
See application file for complete search history.

(56) References Cited

U.S. PATENT DOCUMENTS 10,880,322 B1 * 12/2020 Jakobsson ............... H04L 51/08
2018/0089647 A1 * 3/2018 Sadiq .................... G06Q 20/045

* cited by examiner

*Primary Examiner* — Sm A Rahman
(74) *Attorney, Agent, or Firm* — Steven Stupp

(57) ABSTRACT

A computer that selectively removes online content associated with an individual is described. During operation, the computer may perform an enrollment process associated with the individual, where the enrollment process involves receiving credentials for one or more accounts associated with the individual. Then, based at least in part on the credentials, the computer may monitor a subsequent activity history associated with the individual, where the activity history includes online transactions associated with the individual, and where the online transactions are associated with multiple locations and the one or more accounts. When the computer receives information specifying an occurrence of an event (such as death or illness of the individual), the computer may, based at least in part on the monitored activity history, selectively remove the online content associated with the individual and at least some of the locations.

20 Claims, 7 Drawing Sheets

SELECTIVE ONLINE CONTENT REMOVAL BASED ON ACTIVITY HISTORY

CROSS REFERENCE TO RELATED APPLICATIONS

This application is a continuation of U.S. patent application Ser. No. 17/718,987, "Selective Online Content Removal Based on Activity History," filed on Apr. 12, 2022 (now U.S. patent Ser. No. 11/556,603), which is a continuation of U.S. patent application Ser. No. 17/033,877, "Selective Online Content Removal Based on Activity History," filed on Sep. 27, 2020, which is a continuation of U.S. patent application Ser. No. 16/579,244, "Selective Online Content Removal Based on Activity History," filed on Sep. 23, 2019 (now U.S. Pat. No. 10,817,580), which is a continuation of U.S. patent application Ser. No. 15/996,456, "Selective Online Content Removal Based on Activity History," filed on Jun. 2, 2018 (now U.S. Pat. No. 10,467,310), the contents of both of which are herein incorporated by reference.

BACKGROUND

Field

The described embodiments relate to techniques for estate planning. In particular, the described embodiments relate to techniques for selectively removing online content associated with an individual at one or more locations or one or more accounts based at least in part on a monitored activity history associated with the individual.

Related Art

Trends in connectivity and in electronic devices are resulting in dramatic changes in people's lives. For example, the Internet now allows individuals access to vast amounts of information, as well as the ability to identify and interact with other individuals, organizations and companies around the world. This has resulted in a significant increase in online transactions, including communication (such as email and Short Message Service or SMS messages), financial transactions and social-media postings. In the discussion that follows, the online transactions associated with an individual (including their actions and those of counterparties) are referred to as their 'online presence.'

Online transactions are typically complicated. For example, an individual's online transactions may span multiple locations, such as different email addresses, phone numbers, web pages, websites and, more generally, destinations. Moreover, the counterparties in these online transactions often change as a function of time. Consequently, the individual's online transactions often encompasses multiple online accounts and/or multiple service providers, and is usually time variant.

The dynamic nature and richness of online transactions makes management of an individual's online presence increasingly difficult. This challenge is compounded if the individual becomes incapacitated or if they die, because the individual's situational awareness of and knowledge about their online presence is either unavailable or is lost.

Existing estate-planning approaches attempt to address this problem. For example, an individual may designate a successor and may provide them access information or credentials (such as usernames and passwords) for one or more of the individual's online accounts. However, estate plans are, at best, quasi-static. Once an individual establishes an estate plan, they typically do not revisit or update it for an extended period of time. This inflexibility is often poorly suited for managing dynamic assets, such as an individual's online presence.

SUMMARY

The described embodiments relate to a computer that selectively removes online content associated with an individual. During operation, the computer performs an enrollment process associated with the individual, where the enrollment process involves receiving credentials for one or more accounts associated with the individual. Then, based at least in part on the credentials, the computer monitors a subsequent activity history associated with the individual, where the activity history includes online transactions associated with the individual, and where the online transactions are associated with multiple locations and the one or more accounts. When the computer receives information specifying an occurrence of an event, the computer selectively removes the online content associated with the individual and at least some of the locations based at least in part on the monitored activity history.

Moreover, the enrollment process may involve providing an instruction to download or to install a tracking application that tracks the activity history, and the monitoring may involve the computer receiving information specifying the tracked activity history. Alternatively, the enrollment process may involve installing the tracking application on an electronic device. In some embodiments, the enrollment process may involve setting up cloud-based tracking that performs the monitoring of the activity history.

Furthermore, the locations may include locations associated with counterparties in online transactions with the individual. Additionally, the locations may include destinations and sources in the online transactions. For example, the locations may include: email addresses, cellular-telephone numbers, web pages, websites and/or identifiers of electronic devices (such as a media access control address). In some embodiments, the locations include a hyperlink or a uniform resource locator.

Note that the event may include the individual's death.

Moreover, the computer may be associated with an entity that is different from one or more service providers that provide one or more services associated with the one or more accounts.

Furthermore, the online content may include: messages associated with a communication account (such as email or a cellular-telephone account), transaction information associated with a financial account (such as a bank account), information associated with a weblog, and/or activity associated with a social-media account (such as uploaded content, comments, messages or other postings).

Additionally, in response to receiving the information that specifies the occurrence of the event, the computer may perform an additional remedial action. For example, the computer may provide a notification of the occurrence of the event to one or more service providers associated with the one or more accounts. Alternatively or additionally, the computer may store or archive at least some of the online content.

In some embodiments, the one or more accounts include multiple accounts that are associated with different service providers.

Another embodiment provides a computer-readable storage medium with program instructions for use with the computer. When executed by the computer, the program instructions cause the computer to perform at least some of the aforementioned operations.

Another embodiment provides a method, which may be performed by the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
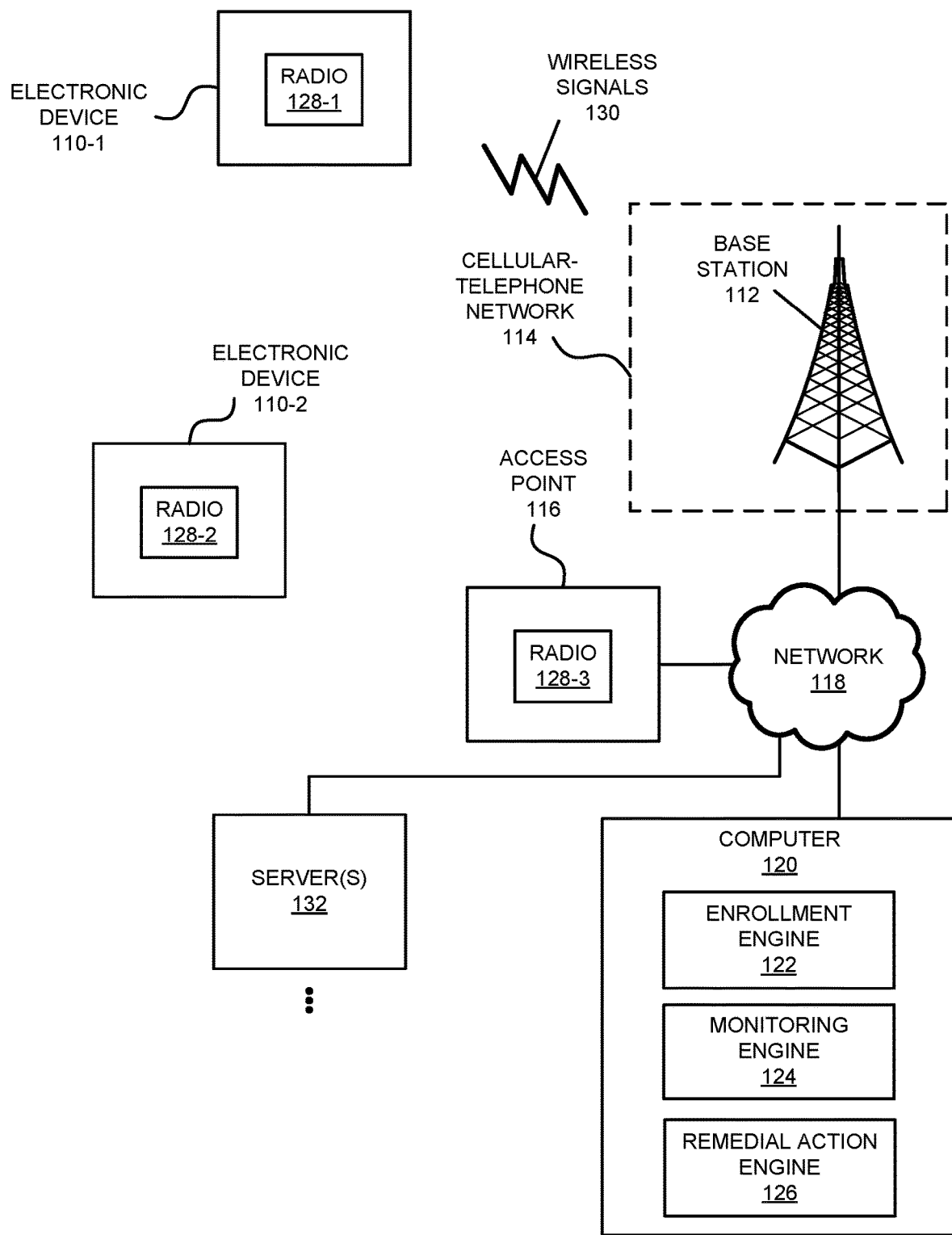
FIG. 1 is a block diagram illustrating communication among and electronic devices and a computer in a system in accordance with an embodiment of the present disclosure.

A computer that selectively removes online content associated with an individual is described. During operation, the computer may perform an enrollment process associated with the individual, where the enrollment process involves receiving credentials for one or more accounts associated with the individual. Then, based at least in part on the credentials, the computer may monitor a subsequent activity history associated with the individual, where the activity history includes online transactions associated with the individual, and where the online transactions are associated with multiple locations and the one or more accounts. When the computer receives information specifying an occurrence of an event (such as death or illness of the individual), the computer may, based at least in part on the monitored activity history, selectively remove the online content associated with the individual and at least some of the locations.

By monitoring the activity history and then selectively removing the online content (and, more generally, selectively performing a remedial action when the event occurs), this management technique may facilitate management of dynamic assets (such as the individual's online presence) as part of an estate plan. Notably, the management technique may allow the individual to ensure that their online presence across multiple locations and/or one or more accounts is managed in accordance with their wishes when they are incapacitated or deceased. For example, by monitoring the activity history, the management technique may maintain situational awareness and/or knowledge of the individual's online presence, which may enable the subsequent selective removal of the online content as needed. Consequently, the management technique may provide flexible estate planning for dynamic assets. These capabilities may provide improve the estate-planning service and the overall user experience.

In the discussion that follows, an individual or a user may be a person. Also, or instead, the management technique may be used by any type of organization, such as a business (which should be understood to include for-profit corporations), non-profit corporations, groups (or cohorts) of individuals, sole proprietorships, government agencies, partnerships, etc.

Moreover, in the discussion that follows, electronic devices and/or the computer may communicate using a wide variety of communication protocols. For example, the communication may involve wired or wireless communication. Consequently, the communication protocol may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS or LTE), an IEEE 802.3 standard (which is sometimes referred to as 'Ethernet'), another wired communication protocol, etc. In the discussion that follows, Ethernet, Wi-Fi and a cellular-telephone communication protocol are used as illustrative examples. However, a wide variety of communication protocols may be used, including a peer-to-peer communication protocol that facilitates direct communication between at least a pair of electronic devices.

Communication among electronic devices (which are sometimes referred to as 'components') is shown in FIG. 1, which presents a block diagram illustrating a computer 120 that monitors online transactions and selectively removed associated online content. Notably, individuals may use electronic devices 110 (such as portable electronic devices, e.g., cellular telephones) and may communicate with each other via optional base station 112 in cellular-telephone network 114 and/or optional access point 116. For example, an electronic device (such as electronic device 110-1) may communicate with another electronic device or computer in FIG. 1 via cellular-telephone network 114 and/or a network 118 (such as an intranet, the Internet and/or a wireless local area network or WLAN). Moreover, one or more of electronic devices may communicate with computer 120 (such as a computer, a server or a computer system), which may include: an enrollment engine 122, a monitoring engine 124 and remedial action engine 126. Thus, the communication in FIG. 1 may be wired and/or wireless. Note that access point 116 may provide access to network 118 via an Ethernet protocol, and may be a physical access point or a virtual or 'software' access point that is implemented on a computer or an electronic device.

In embodiments where the communication involves wireless communication via a WLAN, the wireless communication includes: transmitting advertising frames on wireless channels, detecting another component in FIG. 1 by scanning wireless channels, establishing connections (for example, by transmitting association requests, data/management frames, etc.), optionally configuring security options (e.g., Internet Protocol Security), and/or transmitting and receiving packets or frames via the connection. Moreover, in embodiments where the communication involves wireless communication via cellular-telephone network 114, the wireless communication includes: establishing connections, and/or transmitting and receiving packets.

Figure 6:
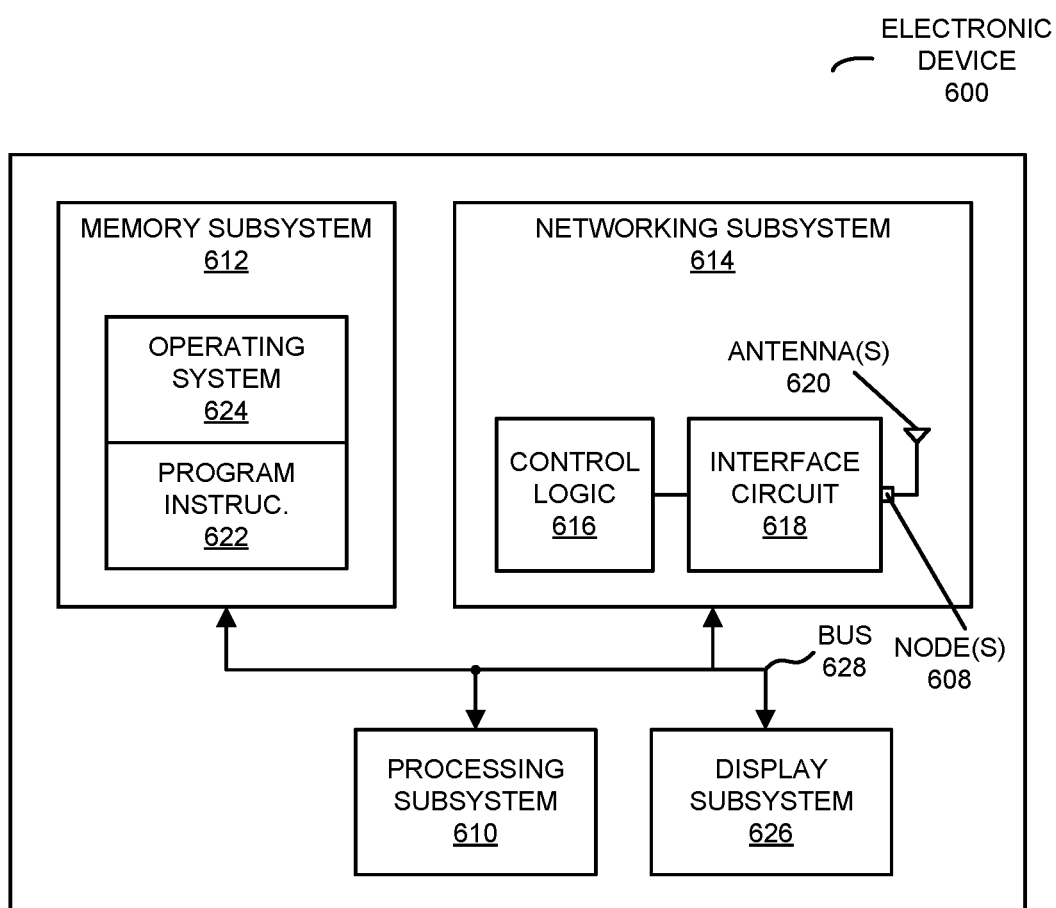
FIG. 6 is a block diagram illustrating an electronic device in accordance with an embodiment of the present disclosure.

As described further below with reference to FIG. 6, electronic devices 110, base station 112, access point 116 and/or computer system 120 may include subsystems, such as a networking subsystem, a memory subsystem and a processor subsystem. In addition, electronic devices 110, base station 112, access point 116 and/or computer 120 may include radios 128 in the networking subsystems. More generally, the components can include (or can be included within) any electronic devices with the networking subsystems that enable these components to communicate with each other.

Moreover, as can be seen in FIG. 1, wireless signals 130 (represented by jagged lines) are transmitted by radios 128 in the components. For example, radio 128-1 in electronic device 110-1 may transmit information (such as frames or packets) using wireless signals 130. These wireless signals may be received by radios 128 in one or more of the other components, such as by electronic device 110-2. This may allow components in FIG. 1 to communicate information with each other via network 118. Note that while instances of radios 128 are shown in FIG. 1, one or more of these instances may be different from the other instances of radios 128.

In the described embodiments, processing a packet or frame in a component may include: receiving the wireless or wired signals with the packet or frame; decoding/extracting the packet or frame from the received wireless or wired signals to acquire the packet or frame; and processing the packet or frame to determine information contained in the packet or frame.

Note that the communication between at least any two of the components in FIG. 1 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Individuals may use electronic devices 110 to conduct online transactions. In the present discussion, an 'online transaction' should be understood to include an activity in which information is exchanged between a source and a destination via a network. For example, an individual using electronic device 110-1 may perform an online transaction by communicating a message (such as an email or an SMS message) with another electronic device (such as electronic device 110-2). In this example, the online transaction is associated with an email address of a counterparty (such as another individual) or a cellular-telephone number of electronic device 110-2. Moreover, the source of the online transaction is electronic device 110-1 and has an associated source location (such as a media access control address of electronic device 110-1, or a cellular-telephone number of electronic device 110-1 and/or a cell in cellular-telephone network 114), and the destination of the online transaction is electronic device 110-2 and has an associated destination location (such as a media access control address of electronic device 110-2, or a cellular-telephone number of electronic device 110-2 and/or the same or another cell in cellular-telephone network 114). Alternatively, the online transaction may involve electronic device 110-1 receiving a message from, e.g., electronic device 110-2, in which case the online transaction is associated with an email address of the individual or a cellular-telephone number of electronic device 110-1. Furthermore, the source of the online transaction is electronic device 110-2 and has an associated source location (such as a media access control address of electronic device 110-2, or a cellular-telephone number of electronic device 110-2 and/or the same or different cell in cellular-telephone network 114), and the destination of the online transaction is electronic device 110-1 and has an associated destination location (such as a media access control address of electronic device 110-1, or a cellular-telephone number of electronic device 110-1 and/or the cell in cellular-telephone network 114).

Another example of an online transaction may involve the individual using electronic device 110-1 to access a weblog or a social-media account (such as a web page or a website) to upload content, post a message or a comment, etc. In this example, the online transaction is associated with a source location (such as the media access control address of electronic device 110-1, or the cellular-telephone number of electronic device 110-1 and/or the cell in cellular-telephone network 114) and a destination location (such as a uniform resource locator of a web page or a website of the weblog or a web page or website in a social network, which may be associated with the same or a different social-media account in the social network, e.g., the social-media account of the individual or a social-media account of a counterparty in the social network).

While preceding examples illustrated online transactions with messages or activity associated with a social-media account, in some embodiments an online transaction may include a financial transaction with a bank (such as a deposit, a wire transfer, a withdrawal, etc.) or a credit or debit-card company. More generally, an online transaction may include a financial transaction with a third party, such as a merchant. Consequently, in some embodiments an online transaction may include e-commerce.

Note that, in general, the online transactions may involve multiple locations (such as source locations and destination locations), multiple accounts (such as email accounts, cellular-telephone accounts, bank accounts, social-media accounts, etc.) of the individual and/or counterparties in the online transactions. Therefore, the online transactions may encompass or include activities that involve locations from or associated with multiple different entities, such as different service providers (e.g., different social-media service providers that provide services associated with various accounts), different cellular-telephone providers, different merchants, different banks, different credit or debit-card companies, etc.).

As discussed previously, the diverse and dynamic nature of such online transactions can make it difficult for the individual to manage their online presence. For example, it can make it difficult for the individual to control their online content (including any information associated with or included in one of the online transactions). For example, if the individual is incapacitated or dies, the individual's estate may have difficulty in carrying out their wishes regarding their online presence.

In order to address this problem, computer 120 may implement the management technique. Notably, as described further below with reference to FIGS. 2 and 3, the individual (or their representative) may enroll the individual in a management service that is provided by an entity (such as a company) associated with computer 120. This entity may be different from the service providers associated with one or more accounts of the individual. For example, the entity may be a third party to the service providers and the individual.

Notably, during enrollment, the individual may provide, from electronic device 110-1 and to enrollment engine 122 in computer 120, credentials for one or more accounts associated with the individual (such as one or more email accounts, one or more cellular-telephone accounts, one or more bank accounts, one or more credit or debit-card accounts, one or more social-media accounts, etc.). Moreover, enrollment engine 122 may optionally install a tracking application (such as software) that executes in an environment on electronic device 110-1. For example, the tracking application may be: a software application (such as a stand-alone software application) that executes in the environment of an operating system on electronic device 110-1; or a browser plugin that executes in the environment of a Web browser on electronic device 110-1. Alternatively or additionally, enrollment engine 122 may optionally instruct the individual to download the tracking application onto electronic device 110-1, such as from a web page or a website.

In some embodiments, enrollment engine 122 may optionally enable or set up cloud-based tracking by monitoring engine 124. For example, the cloud-based tracking may function as an intermediary between electronic device 110-1 and one or more servers 132 that implement services (such as one or more social networks) associated with the one or more accounts, and which are provided by one or more service providers. During this tracking, monitoring engine 124 may receive traffic to or from electronic device 110-1 (which is associated with online transactions) and may store information associated with the online transactions in an activity-history log or data structure before forwarding the traffic to its destination location(s). Alternatively, the cloud-based tracking may optionally use a client-server architecture to provide a web page that is displayed in a Web browser or a software application on electronic device 110-1. Then, information associated with the online transactions, which is provided or received via the web page or the software application, may be stored in an activity-history log or data structure that is associated with computer 120.

Then, based at least in part on the credentials, monitoring engine 124 in computer 120 may, at least in part via network 120, monitor a subsequent activity history associated with the individual, where the activity history includes online transactions associated with the individual, and where the online transactions are associated with multiple locations and the one or more accounts. For example, the optional tracking application installed on electronic device 110-1 may track the online transactions associated with the individual (such as when the individual is the originator of the online transaction, or when the individual is the recipient in the online transaction), and may upload information (such as periodically, as needed when an online transaction occurs, or when polled by monitoring engine 124) about the tracked activity history to monitoring engine 124. Thus, the monitoring performed by monitoring engine 124 may include receiving this information. Alternatively or additionally, the activity history may be monitored by monitoring engine 124. For example, monitoring engine 124 may use to credentials to access one or more accounts of the individual (such as periodically, as needed when there is an online transaction and/or when instructed by computer 120), and may compile a log or a data structure of online transactions, i.e., the activity history. Note that the monitoring performed by monitoring engine 124 following enrollment may be performed continuously or when the individual is involved in or conducts an online transaction.

Figure 7:
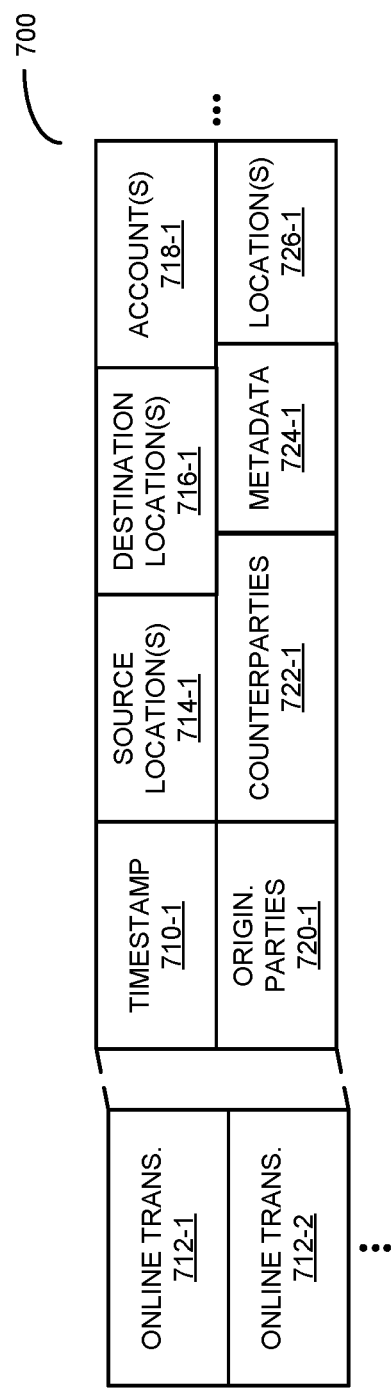
FIG. 7 is a data structure for use with the electronic device of FIG. 6 in accordance with an embodiment of the present disclosure.

As described further below with reference to FIG. 7, the activity history may include: timestamps of the online transactions, source locations, destination locations, one or more accounts associated with the online transactions, information specifying originating parties in the online transactions, information specifying counterparties in the online transactions, metadata associated with the online transactions (such as a summary of online content associated with the online transactions, types of online transactions, etc.), and/or pointers or locations of the online content associated with the online transactions. For example, the source locations and/or the destination locations may include: email addresses, cellular-telephone numbers, web pages, websites and/or identifiers of electronic devices (such as a media access control address). In some embodiments, the locations include a hyperlink or a uniform resource locator.

Furthermore, when computer 120 subsequently receives, via network 118, information that specifies an occurrence of an event (such as when the individual is ill, incapacitated or deceased, or when the individual decides they want computer 120 to act on their behalf, e.g., if the individual wants online content associated with certain online transactions removed), remedial action engine 126 may selectively remove online content associated with the individual and at least some of the locations (such as at least some of the source locations and/or the destination locations) based at least in part on the monitored activity history. For example, the selective removal may remove some or all of the online content for the online transactions included in the activity history, including the online content associated with accounts of the individual and/or counterparties in the online transactions. Note that removing the online content may involve: erasing at least some of the online content; instructing one or more service providers of services associated with one or more accounts to erase at least some of the online content; and/or downloading or storing at least some of the online content.

Figure 4:
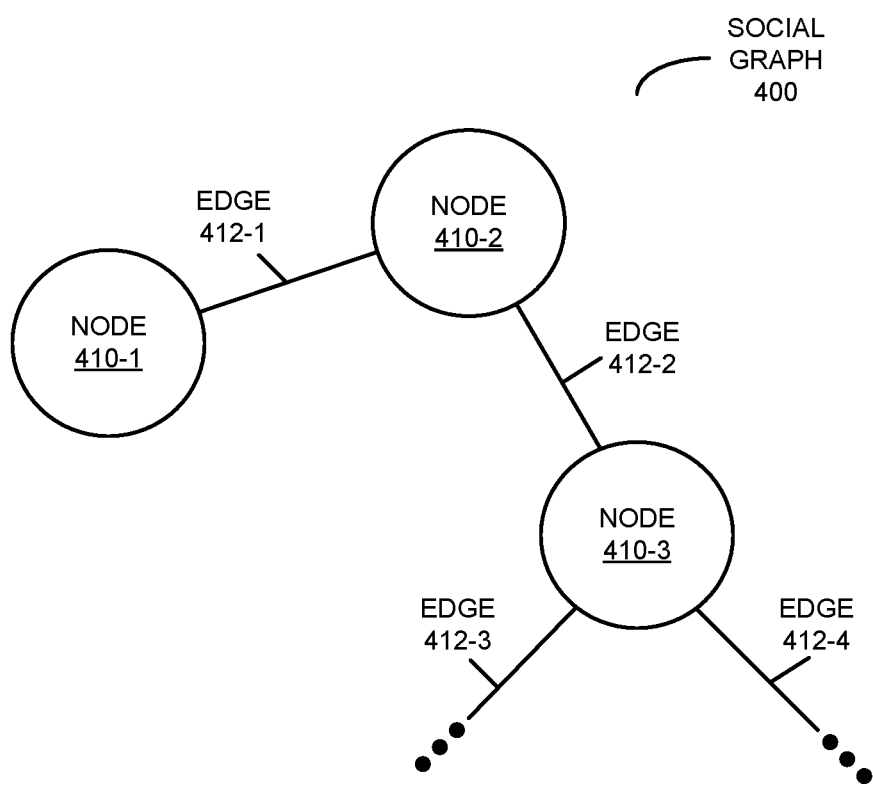
FIG. 4 is a drawing illustrating a social graph corresponding to an individual's online transactions in accordance with an embodiment of the present disclosure.

For example, as described further below with reference to FIG. 4, the online transactions in the activity history may be described by a social graph, with nodes representing the individual and one or more counterparties, and a branch connecting them representing an online transaction. This information may allow remedial action engine 126 to selectively remove the online content from one or more accounts associated with the individual and/or one or more accounts associated with the one or more counterparties. Therefore, in some embodiments, selective removal of online content for a particular online transaction may involve or may encompass more than one account, such as an account associated with the individual and another account associated with at least a counterparty (e.g., another individual, an organization, a company, etc.). However, even when the online content is only removed from accounts associated with the individual, at least some of the one or more accounts may be associated with different service providers.

Additionally, the information in the social graph may allow particular online transactions (i.e., a subset) to be selectively removed. Thus, the information in the activity history may allow remedial action engine 126 to remove some or all of the online content corresponding to the logged or monitored online transactions in the activity history. When removing particular online content, the remedial action engine 126 may communicate with, e.g., one of servers 132, and using the information in the activity history and the credentials may requests that that this online content be removed.

Figure 5:
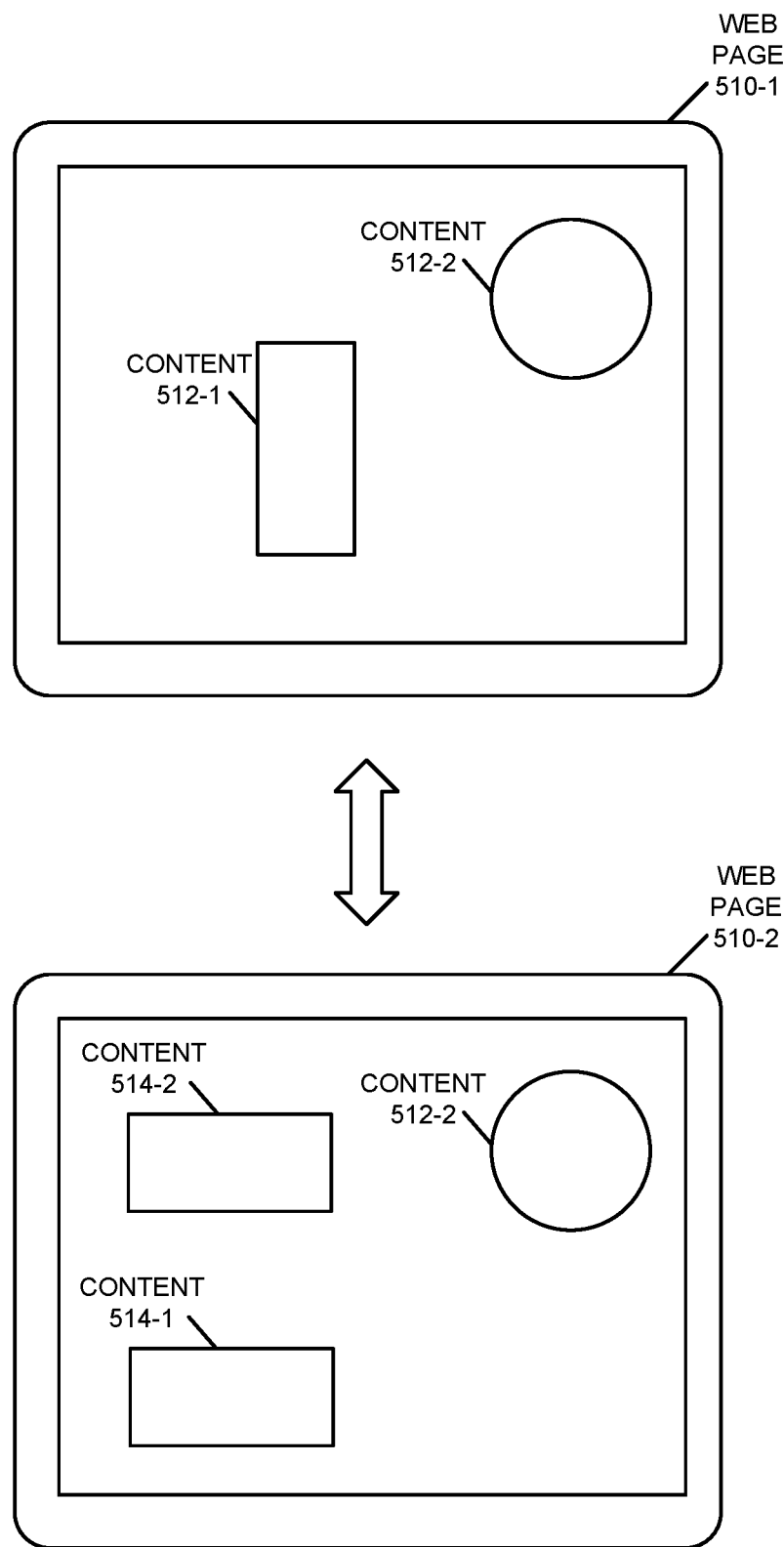
FIG. 5 is a drawing illustrating the selective modification of online content at a location in accordance with an embodiment of the present disclosure.

In some embodiments, in response to receiving the information that specifies the occurrence of the event, remedial action engine 126 may perform an additional remedial action. For example, remedial action engine 126 may provide a notification of the occurrence of the event to one or more service providers associated with the one or more accounts, such as to one or more servers 132. As shown in FIG. 5, the notification may include information from the activity history, and may result in a modification of the online content associated with specific online transactions, such as an indication that the event has occurred and, therefore, that the online content is dated. Alternatively or additionally, the addition remedial action may include remedial action engine 126 storing or archiving at least some of the online content, e.g., in a data structure associated with computer 120.

While the preceding discussion illustrated the use of the management technique to selectively remove online content, in other embodiments the management technique is used to selectively modify the online content (instead of removing the online content) after information indicating the occurrence of the event has been received.

Thus, by monitoring the activity history, computer 120 may capture the dynamic nature and the richness of an individual's online transactions. This information may allow computer 120 to flexibly track both long-lived and ephemeral connections between the individual and counterparties. Consequently, if the event occurs, computer 120 may be able to accurately and systematically remove online content and/or to perform remedial action(s) per the individual's wishes. Therefore, the management technique implemented by computer 120 may facilitate improved services for the individual, such as estate planning for social-media accounts. More generally, the management technique may maintain situational awareness or knowledge of the individual's online transactions, which subsequently can be used to provide improved control over the individual's online presence.

The management technique improves the efficiency of computer 120 by allowing online content associated with accounts from one or more (such as, multiple) different service providers to be removed (or, more generally, modified). Notably, computer 120 may use less processor cycles, memory and network bandwidth because the activity history may facilitate targeted (i.e., selective) removal of online content, as opposed to either blanket removal or repeated requests to remove additional online content that is identified subsequent to an initial request to remove online content. Moreover, because the activity history is based on online transactions, in some embodiments the management technique is in the realm of computer technology. In addition, the information about counterparties that is included in the activity history allows the online content to be more systematically removed (or, more generally, modified), as opposed to focusing solely on the online content associated with the individual's accounts. The management technique also adapts to dynamic changes in the individual's online presence and enables significant improvements in services, such as estate planning.

Figure 2:
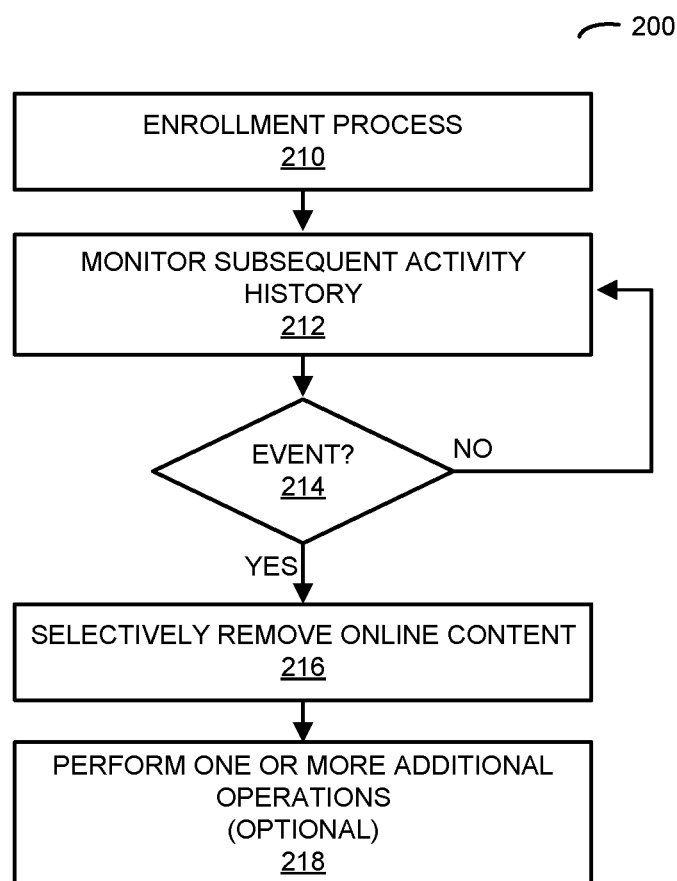
FIG. 2 is a flow diagram illustrating a method for selectively removing online content in accordance with an embodiment of the present disclosure.

We now describe embodiments of the management technique. FIG. 2 presents a flow diagram illustrating an example of a method 200 for selectively removing online content associated with an individual (or an electronic device associated with the individual), which may be performed by a computer (such as computer 120 in FIG. 1). During operation, the computer may perform an enrollment process (operation 210) associated with the individual, where the enrollment process involves receiving credentials for one or more accounts associated with the individual.

Then, based at least in part on the credentials, the computer may monitor a subsequent activity history (operation 212) associated with the individual, where the activity history includes online transactions associated with the individual, and where the online transactions are associated with multiple locations and the one or more accounts. Alternatively, in some embodiments, instead of only monitoring or tracking subsequent activity history, the computer may also retroactively attempt to reconstruction prior online transactions, which may be included in the activity history. For example, the computer may scrape a web page or a website associated with a social-media account, and may analyze the scraped information (e.g., using optical image and/or optical character recognition) to obtain the information about the prior online transactions. In another example, the computer may access a record of emails, texts and/or phone calls that were previously received by the individual and may include this information about the prior online transactions in the activity history.

Note that the locations may include locations associated with counterparties in online transactions with the individual. Additionally, the locations may include destinations and sources in the online transactions. For example, the locations may include: email addresses, cellular-telephone numbers, web pages, websites and/or identifiers of electronic devices (such as a media access control address). In some embodiments, the locations include a hyperlink or a uniform resource locator.

When the computer receives information specifying an occurrence of an event (operation 214), the computer selectively removes the online content (operation 216) associated with the individual and at least some of the locations based at least in part on the monitored activity history. Note that the event may include the individual's death. Furthermore, the online content may include: messages associated with a communication account (such as email or a cellular-telephone account), transaction information associated with a financial account (such as a bank account), information associated with a weblog, and/or activity associated with a social-media account (such as uploaded content, audio, video, text, photographs or images, comments, messages or other postings).

In some embodiments, the computer optionally performs one or more additional operations (operation 218). For example, the enrollment process (operation 210) may involve providing an instruction to download or to install a tracking application (e.g., on an electronic device associated with the individual) that tracks the activity history, and the monitoring may involve (operation 212) the computer receiving information specifying the tracked activity history. Alternatively, the enrollment process (operation 210) may involve installing the tracking application on the electronic device. In some embodiments, the enrollment process (operation 210) may involve setting up cloud-based tracking that performs the monitoring (operation 212) of the activity history.

Moreover, in response to receiving the information that specifies the occurrence of the event (operation 214), the computer may perform an additional remedial action. For example, the computer may provide a notification of the occurrence of the event to one or more service providers associated with the one or more accounts based at least in part on the monitored activity history. More generally, the computer may selectively modify the online content based at least in part on the monitored activity history. Alternatively or additionally, the computer may store or archive at least some of the online content based at least in part on the monitored activity history.

Note that the computer may be associated with an entity that is different from one or more service providers that provide one or more services associated with the one or more accounts. Furthermore, the one or more accounts may include multiple accounts that are associated with different service providers.

In some embodiments of method 200, there may be additional or fewer operations. Furthermore, the order of the operations may be changed, and/or two or more operations may be combined into a single operation.

Figure 3:
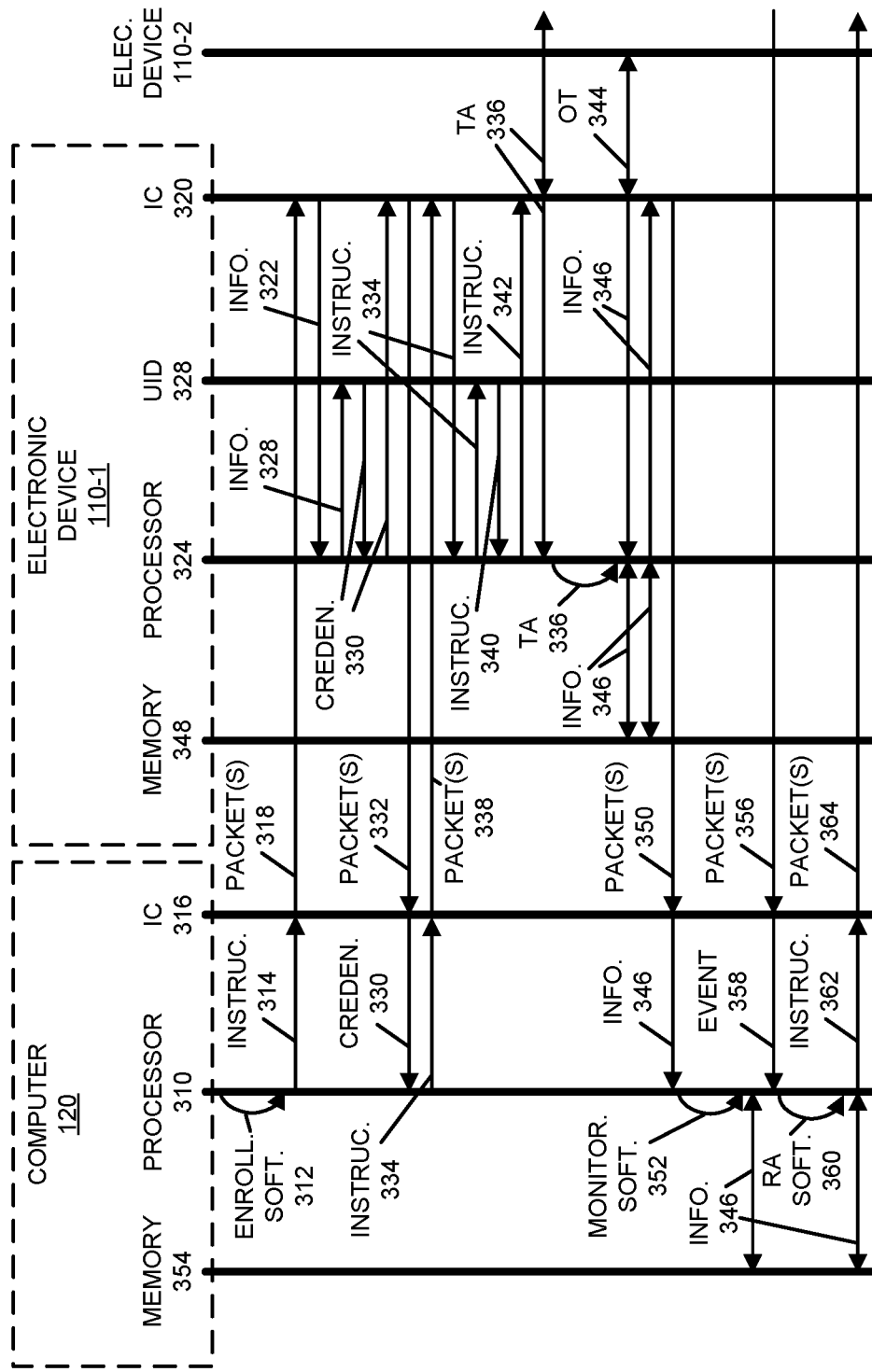
FIG. 3 is a drawing illustrating communication among the electronic devices and the computer in FIG. 1 in accordance with an embodiment of the present disclosure.

FIG. 3 presents a drawing illustrating an example of communication among electronic device 110-1, electronic device 110-2 and computer 120. In FIG. 3, processor 310 in computer 120 executing enrollment software 312 (which is an example of a software implementation of an 'enrollment engine') may instruct 314 an interface circuit (IC) 316 in computer 120 electronic device 110-1 to perform an enrollment process by communicating one or more packets 318 or frames with electronic device 110-1.

After receiving the one or more packets 318 or frames, interface circuit 320 in electronic device 110-1 may provide information 322 in the one or more packets 318 or frames to processor 324 in electronic device 110-1. Processor 324 may provide a request for information 326 to user-interface device (UID) 328 in electronic device 110-1 (such as a touch-sensitive display). In response, a user of electronic device 110-1 may use user-interface device 328 to provide credentials 330 for one or more accounts. Processor 324 may forward information specifying credentials 330 to interface circuit 320, which transmits one or more packets 332 or frames to computer 120. Then, after receiving the one or more packets 332 or frames, interface circuit 316 may forward credentials 330 to processor 310.

Next, processor 310 may provide an instruction 334 to interface circuit 316 for the user to install or download a tracking application (TA) 336 on electronic device 110-1. This instruction may be provided in one or more packets 338 or frames to interface circuit 320, which forwards them to processor 324. In response, processor 324 may provide instruction 334 to user-interface device 328. Furthermore, the user may use user-interface device 328 to provide instruction 340 to download or install tracking application 336. Additionally, based at least in part on instruction 340, processor 324 may instruct 342 interface circuit 320 to download tracking application 336 (e.g., from a remote server or computer, which is not shown in FIG. 3). This tracking application may be subsequently executed by electronic device 110-1, such as by processor 324.

Tracking application 336 may monitor subsequent online transactions (OT) 344 conducted by a user of electronic device 110-1, e.g., with electronic device 110-2. Moreover, tracking application 336 may store information 346 associated with online transactions 344 in memory 348 in electronic device 110-1. Furthermore, tracking application 336 may provide (periodically, on demand, or as need, such as in response to a request from computer 120) information 346 to interface circuit 320, which transmits information 346 in one or more packets 350 or frames.

After receiving the one or more packets 350 or frames, interface circuit 316 may provide information 346 to processor 310. Monitoring software 352 (which is an example of a software implementation of a 'monitoring engine') executed by processor 310 may store information 346 in an activity history in memory 354 in computer 120.

Subsequently, interface circuit 316 may receive one or more packets 356 or frames with information about the occurrence of an event 358. This information may be forwarded to processor 310. In response, remedial action (RA) software 360 (which is an example of a software implementation of a 'remedial action engine') may access the activity history in memory 354 (such as the information 346). Then, remedial action software 360 may provide an instruction 362 for a remedial action to interface circuit 316, which transmits one or more packets 364 or frames to one or more computers or servers (not shown) of one or more service providers, so the one or more service providers can implement the remedial action. For example, the one or more service providers may selectively remove or modify online content associated with online transactions 344.

While FIG. 3 illustrates unidirectional communication with a line with an arrow on one side and bidirectional communication with a line with arrows on both sides, note that any of these communication operations may be unidirectional or bidirectional.

As described previously, the information in the activity history may be represented using a social graph. This is shown in FIG. 4, which presents a drawing illustrating an example of a social graph 400 corresponding to an individual's online transactions. This social graph may represent the connections or interrelationships among nodes 410 using edges 412. In the context of the management technique, one of nodes 410 (such as node 410-1) may correspond to the individual, and the remainder of nodes 410 may correspond to counterparties, e.g., in one or more social networks. Therefore, edges 412 may represent interrelationships among these entities. For example, edges 412 may indicate or represent the online transactions.

In general, a given node in social graph 400 may be associated with a wide variety of information that is included in the individual's activity history, including: timestamps, source locations, destination locations, one or more accounts associated with the online transactions, information specifying originating parties in the online transactions, information specifying counterparties in the online transactions, metadata associated with the online transactions and/or pointers or locations of the online content associated with the online transactions.

Note that the information or features represented by social graph 400 and/or in the activity history may be used in a supervised-learning model and/or an unsupervised-learning model to facilitate identification of online content that may be selectively removed or modified when the event occurs. For example, the supervised-learning model may be trained using one or more techniques, including: classification and regression trees, another decision-tree technique, logistic regression, linear or nonlinear regression, support vector machines, LASSO, a neural network, etc. Moreover, the unsupervised-learning model may be trained using one or more techniques, including clustering and/or principal component analysis.

Moreover, as described previously, the remedial action(s) in the management technique may include selective removal or modification of online content associated with a prior online transaction. This is shown in FIG. 5, which presents a drawing illustrating an example of the selective modification of online content at a location (such as a web page). Notably, a web page 510-1 may initially include content 512. After receiving selective modification instructions from computer 120 (FIG. 1), a service provider of a service associated with web page 510-1 may modify content 512 in web page 510-2. For example, content 512-1 may be removed (i.e., no longer displayed). Alternatively or additionally, additional content 514 may be displayed instead of content 512-1 and/or proximate to content 512-2. This additional content may indicate, e.g., that the event has occurred. For example, content 514 may include text that indicates that the individual is deceased and that, accordingly, content 512-1 has been removed.

In some embodiments, the management technique is used as part of estate planning. Notably, during the estate-planning process (which may include the enrollment process), an individual may provide credentials for one or more of their accounts, such as: an email account, a telephone account, a social-media account, etc. Then, a tracking application or software (which may be installed on the individual's cellular telephone or computer) may track or monitor the individual's subsequent online transactions, and associated information may be stored in an activity-history data structure. For example, the tracking application may monitor online transactions by or with the individual, including: emails, phone calls, social-media posts, etc. The tracking application may upload the activity history to a cloud-based system, such as monitoring engine 124 in FIG. 1. If the cloud-based system subsequently receives a notification of an event (such as a notification that the individual has died), remedial action engine 126 in FIG. 1 may use the activity history to selectively remove the individual's online content (and, in some embodiments, the individual's complete online presence) from the specified accounts and/or accounts of any counterparties in at least some of the online transactions in the activity history. Alternatively or additionally, remedial action engine 126 in FIG. 1 may use the activity history to selectively aggregate and store online content associated with the specified accounts and/or counterparty accounts for at least some of the online transactions in the activity history. In some embodiments, remedial action engine 126 in FIG. 1 may disseminate information about the event to a third party, such as a social-media provider of a service associated with at least one of the accounts.

Moreover, in some embodiments the management technique is used for end-of-life services or estate planning for individuals that face significant unpredictability in the continued usage and sustainability of their online presence across social media, a financial services account and/or one or more other online services. This may include individuals in high-risk professions, such as: police officers, service members in the military, paramedics and/or others professions. Furthermore, the individuals may include so-called 'digitally vulnerable individuals,' such as an individual who is vulnerable because of a medical condition, old age or even the very young.

The management technique may include one or more operations that provide a seamless user experience within an application and/or a software-based service in which the service is delivered via a network, such as the Internet. Notably, the management technique may include a setup and pre-enrollment operation in order to establish a trusted registry framework. The users may have multiple account credentials across one or more social media web sites, one or more financial web sites and/or one or more other web services. Therefore, in order to enable the service provided in the management technique, the computer system may create a meta-registry as a trusted partner with these Internet web sites and/or web services. Note that the computer system may conduct or perform periodic updates to add new web sites and/or web services to the meta-registry, and the computer system may conduct additional validation and authentication checks during the periodic additions and/or updates in order to maintain a clean and updated meta-registry.

Then, the management technique may include an enrollment operation in order to establish a master identifier with credentials. Notably, an individual master identifier for a user may be created at enrollment. This master identifier may serve as the index for the user in relation to all the listed services. The initialization of the service may result in registration and confirmation of the user's credentials for the listed services. Note that registration and confirmation of these account credentials may be conducted via a network (such as the Internet) using the information stored in the meta-registry (which provides a reference framework).

Next, the management technique may include a monitoring operation. The monitoring of activity across the registered service providers may be active and/or passive (based on user preferences or selection). In an active mode, the computer system may monitor interaction characteristics as needed or periodically (such as based on a predefined frequency or per user preferences). The active mode may capture the frequency of third-party interactions. Moreover, where possible, social-graph inputs may be generated and leveraged from third-party services (such as a social media provider). Note that the active mode may also capture information associated with the identities or identifiers of individuals who are interacting with the user, including the content exchanged and the context. This information may be visible in auto-generated periodic reports.

Alternatively, the passive mode may not monitor interaction characteristics. Instead, in this mode there may be updates to the registry of accounts and/or services (such as for new account activation/enrolment or for deactivation or inactivity/deactivation), based on a periodic or as-needed sweep (e.g., daily, weekly or monthly, as defined by the user preferences) until a pre-defined trigger is activated (such as when the event occurs).

The data generated during the monitoring may be associated with the master identifier. Moreover, the computer system may generate patterns to identify anomalous behavior (e.g., new log-ins, the creation of new identifiers, the closing of existing accounts, sudden spikes or increases in interactions).

In some embodiments, for a registered service the monitoring occurs via application programming interfaces. However, if a service is not registered, the monitoring may occur via scraping. Alternatively or additional, a telemetry-style plug-in that is installed within a registered-service context may be used.

Next, the management technique may include determining an occurrence of an event, identifying an occurrence of an event (such as by monitoring news feeds for verified information that indicates the event has occurred), or receiving information that specifies an occurrence of an event. In response, the computer system may perform a remedial action. For example, the computer system may perform a selective purge or removal, such as: a selective deletion of activities based on an activity history, selective removal of content, selective removal of an account history, etc. Moreover, based on predefined triggers (e.g., a public notice of death, an in-app update by a trusted party or a manual update by user), the computer system may perform a sweep of the user's accounts and/or services with subscriptions and may use the associated online activity or interactions history to selectively purge, suspend, terminate and/or close one or more of the accounts and/or services.

Note that the remedial action may include providing update messages with aggregated updates to a trusted user. Moreover, in some embodiments the collation of identifiers and passwords (i.e., credentials) may be based on a predefined trigger with a validity criterion. Furthermore, the computer system may aggregate information related to financial assets and subscriptions with options to selectively deactivate or close these accounts and/or services. The trigger/sweep operation in response to the occurrence of an event may result in confirmation of deletion of an history of activity or interactions, removal of online content, and/or aggregation of information.

We now describe embodiments of an electronic device, which may perform at least some of the operations in the management technique. FIG. 6 presents a block diagram illustrating an example of an electronic device 600 in accordance with some embodiments, such as one of electronic devices 110, base station 112, access point 116 or computer 120. This electronic device may include processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processing units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: program instructions or sets of instructions (such as program instructions 622 or operating system 624), which may be executed by processing subsystem 610. Note that the one or more computer programs or program instructions may constitute a computer-program mechanism. Moreover, instructions in the various program instructions in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

As discussed previously, memory subsystem 612 may store the activity history in a data structure. This is shown in FIG. 7, which presents a data structure 700 for use with electronic device 600 in FIG. 6. Notably, data structure 700 may include: timestamps 710 of online transactions 712, source locations 714, destination locations 716, one or more accounts 718 associated with online transactions 712, information specifying originating parties 720 in online transactions 712, information specifying counterparties 722 in online transactions 712, metadata 724 associated with online transactions 712 (such as a summary of online content associated with online transactions 712, types of online transactions, etc.), and/or one or more pointers to or locations 726 of the online content associated with online transactions 712. For example, source locations 714 and/or destination locations 716 may include: email addresses, cellular-telephone numbers, web pages, websites and/or identifiers of electronic devices (such as a media access control address). In some embodiments, locations 716 include a hyperlink or a uniform resource locator.

Referring back to FIG. 6, networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620. Note that the one or more nodes 608 may constitute input(s) to and/or output(s) from electronic device 600.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet, a cellular-telephone communication protocol and/or a Wi-Fi communication protocol as an illustrative example, in other embodiments a wide variety of communication protocols and, more generally, wireless communication techniques may be used. For example, the communication protocol in a WLAN may use orthogonal frequency division multiple access (OFDMA). Thus, the management technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the management technique may be implemented using program instructions 622, operating system 624 (such as a driver for interface circuit 618) or in firmware in interface circuit 618. Thus, the management technique may be implemented at runtime of program instructions 622. Alternatively or additionally, at least some of the operations in the management technique may be implemented in a physical layer, such as hardware in interface circuit 618.

While the preceding discussion illustrated the use of the management technique to selectively remove online content following the occurrence of an event, in other embodiments the management technique may be used to selectively perform one or more remedial actions following the occurrence of an event. For example, the remedial action(s) may include: modifying the online content (such as updating or changing the online content based at least in part on the individual's instructions or requests); archiving or storing the online content; and/or adding a notification of the event, so that the online context can be understood in a current context (such as following the death of the individual). Moreover, while examples of the event in the preceding discussion included illness of the individual, incapacitation of the individual (such as when the individual is in the hospital or in a coma), or death of the individual, in other embodiments a wide variety of different types of events may be used. For example, the event may include when the individual (who remains healthy or alive) provides an instruction or a request to selectively remove particular online content (which is a subset of the online content in the activity history). Notably, the individual may regret or wish to change certain online transactions and may wish to change or remove them from their online presence. More generally, the event may include any event or occurrence in the individual's life (a birthday, graduation, marriage, birth of a child, vacation, moving, new job, etc.) and the management technique may be used to selectively remove or modify the online content of the individual in accordance with the event and specific removal or modification criteria that are predefined or specific, e.g., by the individual and/or the entity that provides the management technique.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
   an interface circuit configured to communicate with one or more other electronic devices;
   a processor coupled to the interface circuit; and
   memory, coupled to the processor, storing program instructions, wherein, when executed by the processor, the program instructions cause the computer to perform one or more operations comprising:
   performing an enrollment process associated with the individual, wherein the enrollment process involves receiving, via the interface circuit, credentials for multiple accounts associated with the individual, and wherein the accounts are associated with different service providers;
   monitoring, based at least in part on the credentials, a subsequent activity history associated with the individual, wherein the activity history comprises online transactions associated with the individual, and where the online transactions are associated with multiple locations and the accounts; and
   when the computer receives, via the interface circuit, information specifying an occurrence of an event, selectively removing online content associated with the individual and at least some of the locations based at least in part on the monitored activity history, wherein in response to receiving the information that specifies the occurrence of the event, the one or more operations comprise performing an additional remedial action, and
   wherein the additional remedial action comprises providing a notification of the occurrence of the event to the service providers.

2. The computer of claim 1, wherein the enrollment process comprises providing an instruction to download or to install a tracking application that tracks the activity history, and the monitoring comprises the computer receiving, via the interface circuit, information specifying the tracked activity history.

3. The computer of claim 1, wherein the enrollment process comprises installing the tracking application on an electronic device.

4. The computer of claim 1, wherein the enrollment process comprises setting up cloud-based tracking that performs the monitoring of the activity history.

5. The computer of claim 1, wherein the locations comprise locations associated with counterparties in online transactions with the individual.

6. The computer of claim 1, wherein the locations comprise destinations and sources in the online transactions.

7. The computer of claim 1, wherein the event comprises the individual's death.

8. The computer of claim 1, wherein the computer is associated with an entity that is different from the service providers.

9. The computer of claim 1, wherein the online content comprises one or more of: messages associated with a communication account, transaction information associated with a financial account, information associated with a weblog, or activity associated with a social-media account.

10. The computer of claim 1, wherein the additional remedial action comprises archiving at least some of the online content.

11. A non-transitory computer-readable storage medium storing program instructions that, when executed by a computer, cause the computer to perform one or more operations comprising:
    performing an enrollment process associated with the individual, wherein the enrollment process involves receiving credentials for multiple accounts associated with the individual, and wherein the accounts are associated with different service providers;
    monitoring, based at least in part on the credentials, a subsequent activity history associated with the individual, wherein the activity history comprises online transactions associated with the individual, and where the online transactions are associated with multiple locations and the accounts; and
    selectively removing, based at least in part on the monitored activity history, online content associated with the individual and at least some of the locations after receiving information specifying an occurrence of an event, wherein in response to receiving the information that specifies the occurrence of the event, the one or more operations comprise performing an additional remedial action, and
    wherein the additional remedial action comprises providing a notification of the occurrence of the event to the service providers.

12. The computer-readable storage medium of claim 11, wherein the enrollment process comprises providing an instruction to download or to install a tracking application that tracks the activity history, and the monitoring comprises receiving information specifying the tracked activity history.

13. The computer-readable storage medium of claim 11, wherein the enrollment process comprises setting up cloud-based tracking that performs the monitoring of the activity history.

14. The computer-readable storage medium of claim 11, wherein the locations comprise locations associated with counterparties in online transactions with the individual.

15. The computer-readable storage medium of claim 11, wherein the locations comprise destinations and sources in the online transactions.

16. The computer-readable storage medium of claim 11, wherein the event comprises the individual's death.

17. The computer-readable storage medium of claim 11, wherein the computer is associated with an entity that is different from the service providers.

18. A method for selectively removing online content, wherein the method comprises:
   by a computer:
      performing an enrollment process associated with the individual, wherein the enrollment process involves receiving credentials for multiple accounts associated with the individual, and wherein the accounts are associated with different service providers;
      monitoring, based at least in part on the credentials, a subsequent activity history associated with the individual, wherein the activity history comprises online transactions associated with the individual, and where the online transactions are associated with multiple locations and the accounts; and
   selectively removing, based at least in part on the monitored activity history, the online content associated with the individual and at least some of the locations after receiving information specifying an occurrence of an event, wherein in response to receiving the information that specifies the occurrence of the event, the method comprises performing an additional remedial action, and
   wherein the additional remedial action comprises providing a notification of the occurrence of the event to the service providers.

19. The method of claim 18, wherein the event comprises the individual's death.

20. The method of claim 18, wherein the online content comprises one or more of: messages associated with a communication account, transaction information associated with a financial account, information associated with a weblog, or activity associated with a social-media account.

* * * * *